US011882783B2

(12) United States Patent
Kovach et al.

(10) Patent No.: US 11,882,783 B2
(45) Date of Patent: Jan. 30, 2024

(54) DISC ASSEMBLY FOR AN AGRICULTURAL IMPLEMENT

(71) Applicant: CNH Industrial America LLC, New Holland, PA (US)

(72) Inventors: Michael George Kovach, Morton, IL (US); Timothy Richard Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 174 days.

(21) Appl. No.: 17/315,798

(22) Filed: May 10, 2021

(65) Prior Publication Data

US 2022/0354040 A1   Nov. 10, 2022

(51) Int. Cl.
*A01B 71/04*   (2006.01)
*A01B 15/16*   (2006.01)

(52) U.S. Cl.
CPC .............. *A01B 71/04* (2013.01); *A01B 15/16* (2013.01)

(58) Field of Classification Search
CPC ........... A01B 71/04; A01B 5/00; A01B 15/18; A01B 21/04; A01B 21/086; A01B 23/06; A01B 15/16; A01B 49/027
See application file for complete search history.

(56) References Cited

U.S. PATENT DOCUMENTS

| | | | |
|---|---|---|---|
| 692,190 A | 1/1901 | Bailey | |
| 861,704 A * | 7/1907 | Brew | A01B 23/06 172/599 |
| 1,954,783 A | 4/1934 | Bohmker | |
| 2,003,831 A | 6/1935 | Glaves | |

(Continued)

FOREIGN PATENT DOCUMENTS

| | | | | |
|---|---|---|---|---|
| GB | 1581180 A | * | 12/1980 | ............. A01B 71/04 |
| WO | 2002019791 | | 3/2002 | |

OTHER PUBLICATIONS

AGRI Supply, Covering Disc, https://www.agrisupply.com/covering-disc/p/78269/, Sep. 8, 2020, 3 pgs.

(Continued)

*Primary Examiner* — Adam J Behrens
*Assistant Examiner* — Blake E Scoville
(74) *Attorney, Agent, or Firm* — Rebecca L. Henkel; Rickard K. DeMille

(57) ABSTRACT

A disc assembly for an agricultural implement includes a mounting assembly having a housing and a rotatable shaft configured to be disposed within the housing. The mounting assembly includes a first end cap non-movably coupled to the rotatable shaft, in which the first end cap is configured to engage a longitudinally inward surface of a first disc blade. The mounting assembly also includes a second end cap having a first engagement feature configured to selectively engage a second engagement feature of the rotatable shaft to non-movably couple the second end cap to the rotatable shaft. The second end cap is configured to engage a longitudinally inward surface of a second disc blade, and the second end cap is selectively removable from the rotatable shaft via disengagement of the first and second engagement features to facilitate engagement and disengagement of the rotatable shaft with the longitudinal passage of the housing.

12 Claims, 5 Drawing Sheets

(56) References Cited

U.S. PATENT DOCUMENTS

| | | | |
|---|---|---|---|
| 2,248,069 A | 7/1941 | Domries | |
| 2,253,391 A | 8/1941 | Ohlendorf | |
| 2,406,553 A | 8/1946 | Mader | |
| 2,556,492 A * | 6/1951 | Dockery | A01B 23/06 |
| | | | 172/599 |
| 3,193,022 A | 7/1965 | Wesley et al. | |
| 3,980,355 A * | 9/1976 | Gilles | F16C 19/54 |
| | | | 384/157 |
| 4,196,779 A | 4/1980 | Stellen | |
| 4,607,706 A | 8/1986 | Raynor | |
| 4,785,891 A | 11/1988 | Noland | |
| 4,993,850 A * | 2/1991 | Howse | F16C 35/045 |
| | | | 384/477 |
| 6,330,922 B1 | 12/2001 | King | |
| 6,470,661 B1 | 10/2002 | Plamper | |
| 6,913,085 B2 | 7/2005 | Ruckle | |
| 7,475,738 B2 | 1/2009 | Frasier | |
| 7,806,197 B2 | 10/2010 | Steinlage et al. | |
| 8,899,345 B2 | 12/2014 | Lazcano Lasa | |
| 9,107,340 B2 | 8/2015 | Stark | |
| 11,324,152 B2 * | 5/2022 | Larsen | A01B 33/142 |
| 2004/0228557 A1 | 11/2004 | Ruckle et al. | |
| 2007/0029100 A1 | 2/2007 | Tschetter | |
| 2014/0299343 A1 | 10/2014 | Bruce | |
| 2017/0347520 A1 | 12/2017 | Alig et al. | |
| 2018/0235138 A1 * | 8/2018 | Bulizuik | A01B 15/18 |
| 2020/0323123 A1 | 10/2020 | Larsen | |
| 2021/0048064 A1 | 2/2021 | Christie et al. | |

OTHER PUBLICATIONS

U.S. Appl. No. 17/315,882, filed May 10, 2021, Blunier.

* cited by examiner

DISC ASSEMBLY FOR AN AGRICULTURAL IMPLEMENT

BACKGROUND

The present disclosure relates generally to a disc assembly for an agricultural implement.

Certain agricultural implements include ground engaging tools configured to interact with soil. For example, a tillage implement may include tillage points and disc blades configured to break up the soil for subsequent planting or seeding operations. Each disc blade may be individually mounted to a respective mounting assembly that facilitates rotation of the disc blade. Each mounting assembly may include a shaft configured to rotate within a bearing assembly, and a hub may be coupled to an end of the shaft. The disc blade may couple to the hub via multiple fasteners, such as four to six bolts. Certain tillage implements include a large number of disc blades, and each disc blade is individually mounted to a respective mounting assembly. Accordingly, such tillage implements include a large number of mounting assemblies, thereby increasing the complexity and the cost of the tillage implements.

BRIEF DESCRIPTION

In certain embodiments, a disc assembly for an agricultural implement includes a mounting assembly including a housing having a longitudinal passage. The mounting assembly also includes a rotatable shaft configured to be disposed within the housing, such that the rotatable shaft extends along the longitudinal passage of the housing. The rotatable shaft is configured to rotate relative to the housing. In addition, the mounting assembly includes a first end cap non-movably coupled to the rotatable shaft. At least a portion of the first end cap is configured to be positioned longitudinally outward from the housing, and the first end cap is configured to engage a longitudinally inward surface of a first disc blade. The mounting assembly also includes a second end cap having a first engagement feature configured to selectively engage a second engagement feature of the rotatable shaft to non-movably couple the second end cap to the rotatable shaft. At least a portion of the second end cap is configured to be positioned longitudinally outward from the housing, the second end cap is configured to engage a longitudinally inward surface of a second disc blade, the first and second engagement features are configured to be positioned longitudinally inward from the second disc blade, and the second end cap is selectively removable from the rotatable shaft via disengagement of the first and second engagement features to facilitate engagement and disengagement of the rotatable shaft with the longitudinal passage of the housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
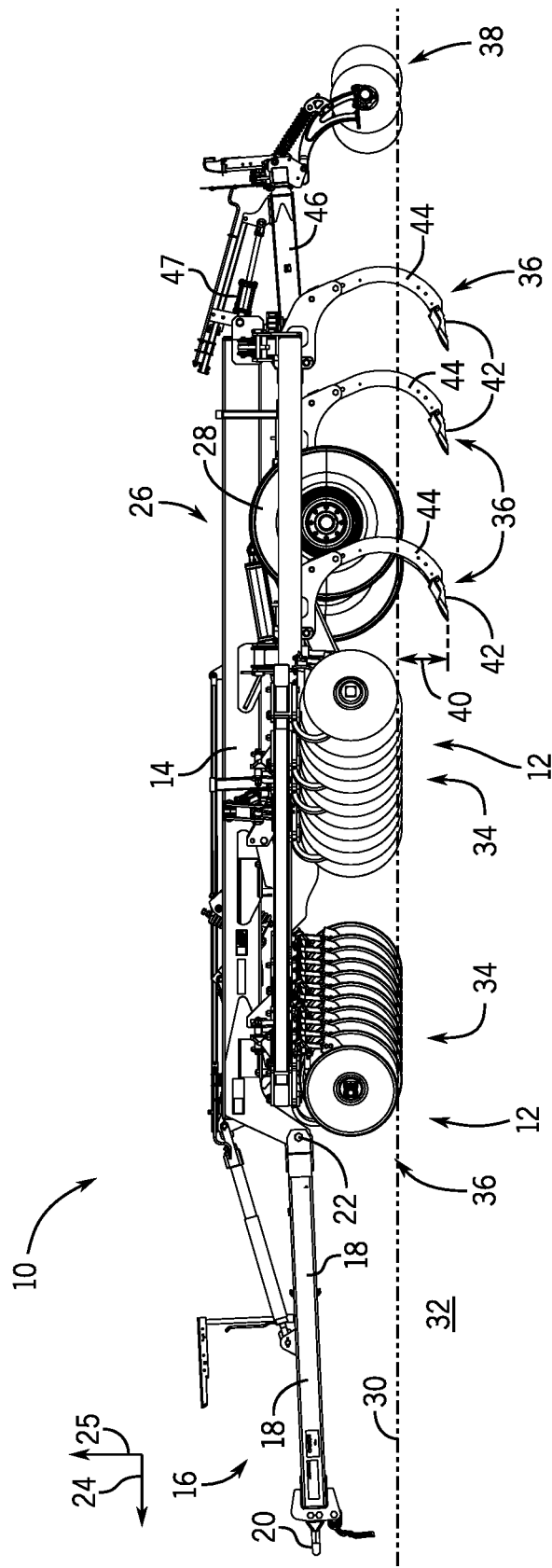
FIG. 1 is a side view of an embodiment of an agricultural implement having disc assemblies.

FIG. 1 is a side view of an embodiment of an agricultural implement 10 having disc assemblies 12. In the illustrated embodiment, the agricultural implement 10 is a primary tillage implement having multiple ground engaging tools configured to till soil. As illustrated, the agricultural implement 10 includes a frame 14 and a hitch assembly 16 coupled to the frame 14. In certain embodiments, the frame 14 is substantially rigid (e.g., does not include any translatable and/or rotatable components). However, in other embodiments, the frame may include one or more translatable and/or rotatable components. Furthermore, the frame 14 may be formed from multiple frame elements (e.g., rails, tubes, braces, etc.) coupled to one another (e.g., via welded connection(s), via fastener(s), etc.). The hitch assembly 16 includes a hitch frame 18 and a hitch 20. The hitch frame 18 is pivotally coupled to the implement frame 14 via pivot joint(s) 22, and the hitch 20 is configured to couple to a corresponding hitch of a work vehicle (e.g., tractor), which is configured to tow the agricultural implement 10 through a field along a direction of travel 24. While the hitch frame 18 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis 25 relative to the implement frame.

As illustrated, the agricultural implement 10 includes wheel assemblies 26 movably coupled to the implement frame 14. In the illustrated embodiment, each wheel assembly 26 includes a wheel frame and a wheel 28 rotatably coupled to the wheel frame. The wheels 28 of the wheel assemblies 26 are configured to engage the surface 30 of the soil 32, and the wheel assemblies 26 are configured to support at least a portion of the weight of the agricultural implement 10. In the illustrated embodiment, each wheel frame is pivotally coupled to the implement frame 14, thereby facilitating adjustment of the position of each wheel 28 along the vertical axis 25. However, in other embodiments, at least one wheel frame may be movably coupled to the implement frame by another suitable connection (e.g., sliding connection, linkage assembly, etc.) that facilitates adjustment of the vertical position of the respective wheel(s).

In the illustrated embodiment, the agricultural implement 10 includes ground engaging tools, such as the illustrated disc blades 34 of the disc assemblies 12, tillage point assemblies 36, and finishing discs 38. The disc blades 34 are configured to engage a top layer of the soil 32. As the agricultural implement 10 is towed through the field, the disc blades 34 are driven to rotate, thereby breaking up the top layer. In the illustrated embodiment, the disc blades 34 are arranged in two rows. However, in alternative embodiments, the disc blades may be arranged in more or fewer rows (e.g., 1, 2, 3, 4, 5, 6, or more). In addition, the angle of each row relative to the direction of travel 24 may be selected to control the interaction of the disc blades 34 with the top layer of the soil 32. The tillage point assemblies 36 are configured to engage the soil 32 at a greater depth 40, thereby breaking up a lower layer of the soil. Each tillage point assembly 36 includes a tillage point 42 and a shank 44. The shank 44 is configured to position the tillage point 42 at the depth 40 beneath the soil surface 30, and the tillage point 42 is configured to break up the soil. The shape of each tillage point 42, the arrangement of the tillage point assemblies 36, and the number of tillage point assemblies 36 may be selected to control tillage within the field. Furthermore, as the agricultural implement 10 is towed through the field, the finishing discs 38 are driven to rotate, thereby sizing soil clods, leveling the soil surface, smoothing the soil surface, cutting residue on the soil surface, or a combination thereof.

In the illustrated embodiment, the finishing discs 38 are rotatably coupled to a finishing disc frame 46, and the finishing disc frame 46 is pivotally coupled to the implement frame 14. In addition, biasing member(s) 47 extend between the implement frame 14 and the finishing disc frame 46. The biasing member(s) 47 are configured to urge the finishing disc frame 46 toward the surface 30 of the soil 32, thereby driving the finishing discs 38 to engage the soil. While the finishing disc frame is pivotally coupled to the implement frame in the illustrated embodiment, in other embodiments, the finishing disc frame may be movably coupled to the implement frame by a linkage assembly (e.g., four bar linkage assembly, etc.) or another suitable assembly/mechanism that enables the finishing disc frame to move vertically relative to the implement frame. Furthermore, in certain embodiments, the finishing disc frame may be non-translatably and/or non-rotatably coupled to the implement frame, or the finishing disc frame may be omitted, and the finishing discs may be coupled to the implement frame.

While the illustrated agricultural implement includes the disc blades 34, the tillage point assemblies 36, and the finishing discs 38, in other embodiments, the agricultural implement may include other and/or additional ground engaging tool(s). For example, the tillage point assemblies and/or the finishing discs may be omitted in certain embodiments. Furthermore, in certain embodiments, the agricultural implement may include one or more other suitable ground engaging tools, such as coulter(s), opener(s), and tine(s), among other suitable ground engaging tools. Furthermore, while the agricultural implement 10 is a primary tillage implement in the illustrated embodiment, in other embodiments, the agricultural implement may be a vertical tillage implement, another suitable type of tillage implement, a seeding implement, a planting implement, or another suitable type of implement.

As discussed in detail below, in certain embodiments, at least one disc assembly 12 (e.g., all disc assemblies 12 of the agricultural implement 10, a portion of the disc assemblies 12 of the agricultural implement, etc.) includes a mounting assembly configured to support a pair of disc blades. In certain embodiments, the mounting assembly includes a housing having a longitudinal passage. In addition, the mounting assembly includes a rotatable shaft configured to be disposed within the housing, such that the rotatable shaft extends along the longitudinal passage of the housing. The rotatable shaft is configured to rotate relative to the housing. The mounting assembly also includes a first end cap non-movably (i.e., non-translatably and non-rotatably) coupled to the rotatable shaft (e.g., welded to the rotatable shaft, integrally formed with the rotatable shaft, etc.). At least a portion of the first end cap is configured to be positioned longitudinally outward from the housing, and the first end cap is configured to engage a longitudinally inward surface of a first disc blade. Furthermore, the mounting assembly includes a second end cap having a first engagement feature configured to selectively engage a second engagement feature of the rotatable shaft to non-movably (i.e., non-translatably and non-rotatably) couple the second end cap to the rotatable shaft. At least a portion of the second end cap is configured to be positioned longitudinally outward from the housing, and the second end cap is configured to engage a longitudinally inward surface of a second disc blade. In addition, the first and second engagement features are configured to be positioned longitudinally inward from the second disc blade, and the second end cap is selectively removable from the rotatable shaft via disengagement of the first and second engagement features to facilitate engagement and disengagement of the rotatable shaft with the longitudinal passage of the housing.

Furthermore, in certain embodiments, the mounting assembly of at least one disc blade assembly 12 (e.g., all disc assemblies 12 of the agricultural implement 10, a portion of the disc assemblies 12 of the agricultural implement, etc.) includes a housing having a longitudinal passage. The mounting assembly also includes a first rotatable shaft configured to be disposed within the housing, such that the first rotatable shaft extends along a first portion of the longitudinal passage of the housing. The first rotatable shaft includes a shoulder. In addition, the mounting assembly includes a second rotatable shaft configured to be disposed within the housing, such that the second rotatable shaft extends along a second portion of the longitudinal passage of the housing. The second rotatable shaft includes a shoulder, and the first and second rotatable shafts are configured to rotate independently of one another relative to the housing. The mounting assembly also includes a first bearing configured to be disposed between the first rotatable shaft and the housing. The shoulder of the first rotatable shaft is configured to engage the first bearing to block longitudinal movement of the first rotatable shaft away from the second rotatable shaft. Furthermore, the mounting assembly includes a second bearing configured to be disposed between the second rotatable shaft and the housing. The shoulder of the second rotatable shaft is configured to engage the second bearing to block longitudinal movement of the second rotatable shaft away from the first rotatable shaft.

Figure 2:
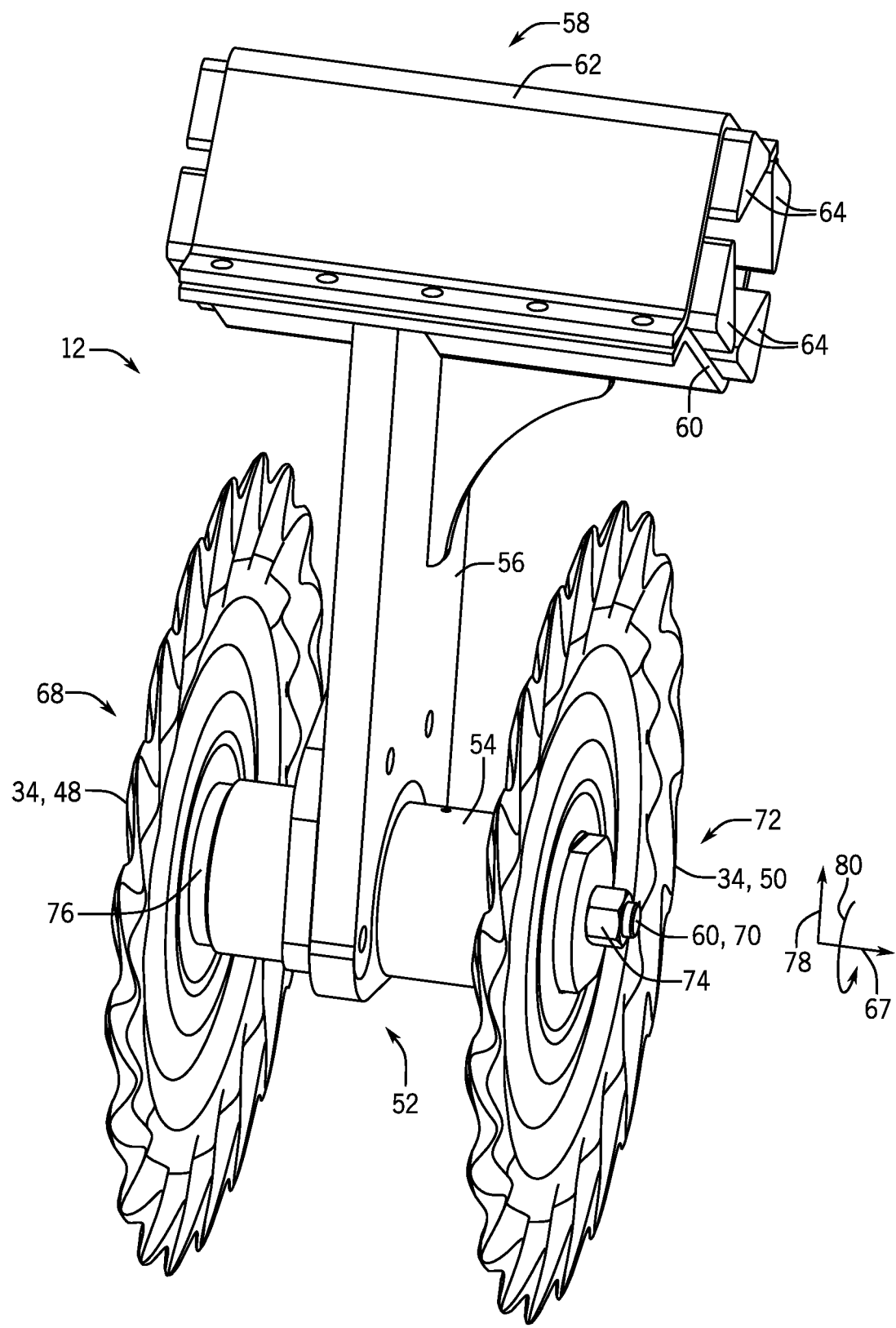
FIG. 2 is a perspective view of an embodiment of a disc assembly that may be employed within the agricultural implement of FIG. 1.

FIG. 2 is a perspective view of an embodiment of a disc assembly 12 that may be employed within the agricultural implement of FIG. 1. In the illustrated embodiment, the disc assembly 12 includes a first disc blade 48 and a second disc blade 50, and each disc blade has a respective opening. In addition, the disc assembly 12 includes a mounting assembly 52 configured to support the disc blades 34 on the agricultural implement. In the illustrated embodiment, the mounting assembly 52 includes a housing 54, an arm 56, and a frame mounting assembly 58. The frame mounting assembly 58 is configured to couple the disc assembly 12 to the frame of the agricultural implement. In the illustrated embodiment, the frame mounting assembly 58 includes a first mount 60, a second mount 62, and engagement elements 64. The engagement elements 64 are configured to engage a frame member of the agricultural implement, and the mounts are configured to couple to one another, such that the engagement elements 64 and the frame member are captured between the mounts, thereby coupling the frame mounting assembly 58 to the frame member. The first mount 60 of the frame mounting assembly 58 is coupled to the arm 56 by any suitable type(s) of connection(s) (e.g., welded connection(s), fastener connection(s), adhesive connection(s), etc.), and the arm 56 is coupled to the housing 54 by any suitable type(s) of connection(s) (e.g., welded connection(s), fastener connection(s), adhesive connection(s), etc.). In addition, as discussed in detail below, the disc blades 34 are rotatably coupled to the housing 54. Accordingly, the mounting assembly 52 supports the disc blades 34 on the agricultural implement.

In certain embodiments, the engagement elements 64 may be formed from a resilient material (e.g., rubber, a polymeric material, etc.) to reduce energy transfer between the disc blades 34 and the frame element. Furthermore, the first and second mounts may be coupled to one another by any suitable type(s) of connector(s) (e.g., fastener(s), pin(s), latch(es), etc.). In certain embodiments, the connector(s) may be selectively removable to facilitate removal of the disc assembly from the frame of the agricultural implement. In addition, while the mounting assembly includes mounts and engagement elements in the illustrated embodiment, in other embodiments, the mounting assembly may include any other suitable structure(s)/element(s) (e.g., alone or in combination with at least one mount and/or at least one engagement element) configured to facilitate coupling the disc assembly to the frame of the agricultural implement, such as fastener(s), plate(s), latch(es), other suitable type(s) of structure(s)/element(s), or a combination thereof. For example, in certain embodiments, the mounting assembly may include a single plate configure to couple to a frame member of the agricultural implement frame by any suitable type(s) of connection(s) (e.g., welded connection(s), adhesive connection(s), fastener connection(s), etc.).

As discussed in detail below, the housing 54 of the mounting assembly 52 has a longitudinal passage, and a rotatable shaft 66 is disposed within the housing 54, such that the rotatable shaft 66 extends along the longitudinal passage of the housing 54 (e.g., along a longitudinal axis 67). Furthermore, the rotatable shaft 66 is configured to rotate relative to the housing 54. In the illustrated embodiment, the rotatable shaft 66 includes a first longitudinal protrusion at a first longitudinal end portion 68 of the rotatable shaft 66, and the first longitudinal protrusion is configured to engage the opening of the first disc blade 48. In addition, the rotatable shaft 66 includes a second longitudinal protrusion 70 at a second longitudinal end portion 72 of the rotatable shaft, and the second longitudinal protrusion 70 is configured to engage the opening of the second disc blade 50. In the illustrated embodiment, the first longitudinal protrusion includes an engagement feature (e.g., external threads, etc.) configured to engage a corresponding engagement feature (e.g., internal threads, etc.) of a first fastener (e.g., nut, etc.) to couple the first disc blade 48 to the rotatable shaft 66, and the second longitudinal protrusion 70 includes an engagement feature (e.g., external threads, etc.) configured to engage a corresponding engagement feature of a second fastener 74 (e.g., nut, etc.) to couple the second disc blade 50 to the rotatable shaft 66. Furthermore, in certain embodiments, the first longitudinal protrusion forms a first key configured to engage the opening of the first disc blade 48 to block rotation of the first disc blade 48 relative to the rotatable shaft 66, and the second longitudinal protrusion 70 forms a second key configured to engage the opening of the second disc blade 50 to block rotation of the second disc blade 50 relative to the rotatable shaft 66. While each disc blade 34 is non-rotatably coupled to the rotatable shaft 66 via a respective longitudinal protrusion in the illustrated embodiment, in other embodiments, at least one disc blade may be non-rotatably coupled to the rotatable shaft by another suitable connection.

Furthermore, the mounting assembly 52 includes a first end cap 76 non-movably (i.e., non-translatably and non-rotatably) coupled to the rotatable shaft 66. At least a portion of the first end cap 76 is configured to be positioned longitudinally outward (e.g., outward along the longitudinal axis 67) from the housing 54, and the first end cap 76 is configured to engage a longitudinally inward surface of the first disc blade 48. The mounting assembly 52 also includes a second end cap having an engagement feature configured to selectively engage a corresponding engagement feature of the rotatable shaft 66 to non-movably (i.e., non-translatably and non-rotatably) couple the second end cap to the rotatable shaft 66. At least a portion of the second end cap is configured to be positioned longitudinally outward (e.g., outward along the longitudinal axis 67) from the housing 54, and the second end cap is configured to engage a longitudinally inward surface of the second disc blade 50. Furthermore, the engagement features are configured to be positioned longitudinally inward from the second disc blade 50, and the second end cap is selectively removable from the rotatable shaft 66 via disengagement of the engagement features to facilitate engagement and disengagement of the rotatable shaft 66 from the longitudinal passage of the housing 54. In the illustrated embodiment, the disc blades 34 are removable from the rotatable shaft 66 without disengaging the engagement features.

A radial extent of each disc blade 34 (e.g., extent of each disc blade 34 along a radial axis 78) may be particularly selected based on the application (e.g., tillage, trench formation, etc.), the soil conditions, the type of soil, the expected speed of the agricultural implement, other suitable factor(s), or a combination thereof. Furthermore, the shape and configuration of the disc blade (e.g., concavity, smooth/notched/fluted, etc.) may also be selected based on the application (e.g., tillage, trench formation, etc.), the soil conditions, the type of soil, the expected speed of the agricultural implement, other suitable factor(s), or a combination thereof. In the illustrated embodiment, each disc blade 34 is formed from steel. However, in other embodiments, at least one disc blade may be formed from any other suitable material(s) (e.g., aluminum, a polymeric material, a composite material, etc.).

During operation of the agricultural implement, the disc blades 34 engage the soil. Movement of the agricultural implement along the direction of travel and friction between the disc blades 34 and the soil urges the disc blades to rotate along a circumferential axis 80. Because the disc blades 34 are non-rotatably coupled to the rotatable shaft and the rotatable shaft is configured to rotate relative to the housing 54 of the mounting assembly 52, the disc blades 34 may rotate during operation of the agricultural implement. Because the mounting assembly 52 is configured to rotatably support two disc blades 34, the number of mounting assemblies within the agricultural implement may be reduced (e.g., as compared to an agricultural implement in which each disc blade is supported by a respective mounting assembly), thereby reducing the cost and complexity of the agricultural implement. Furthermore, because each disc blade is coupled to the mounting assembly with a single fastener, the process of replacing each disc blade may be performed significantly faster than replacing a disc blade that is coupled to a mounting assembly with multiple fasteners disposed about an axis of rotation of the disc blade, thereby increasing the efficiency of agricultural (e.g., tillage) operations.

Figure 3:
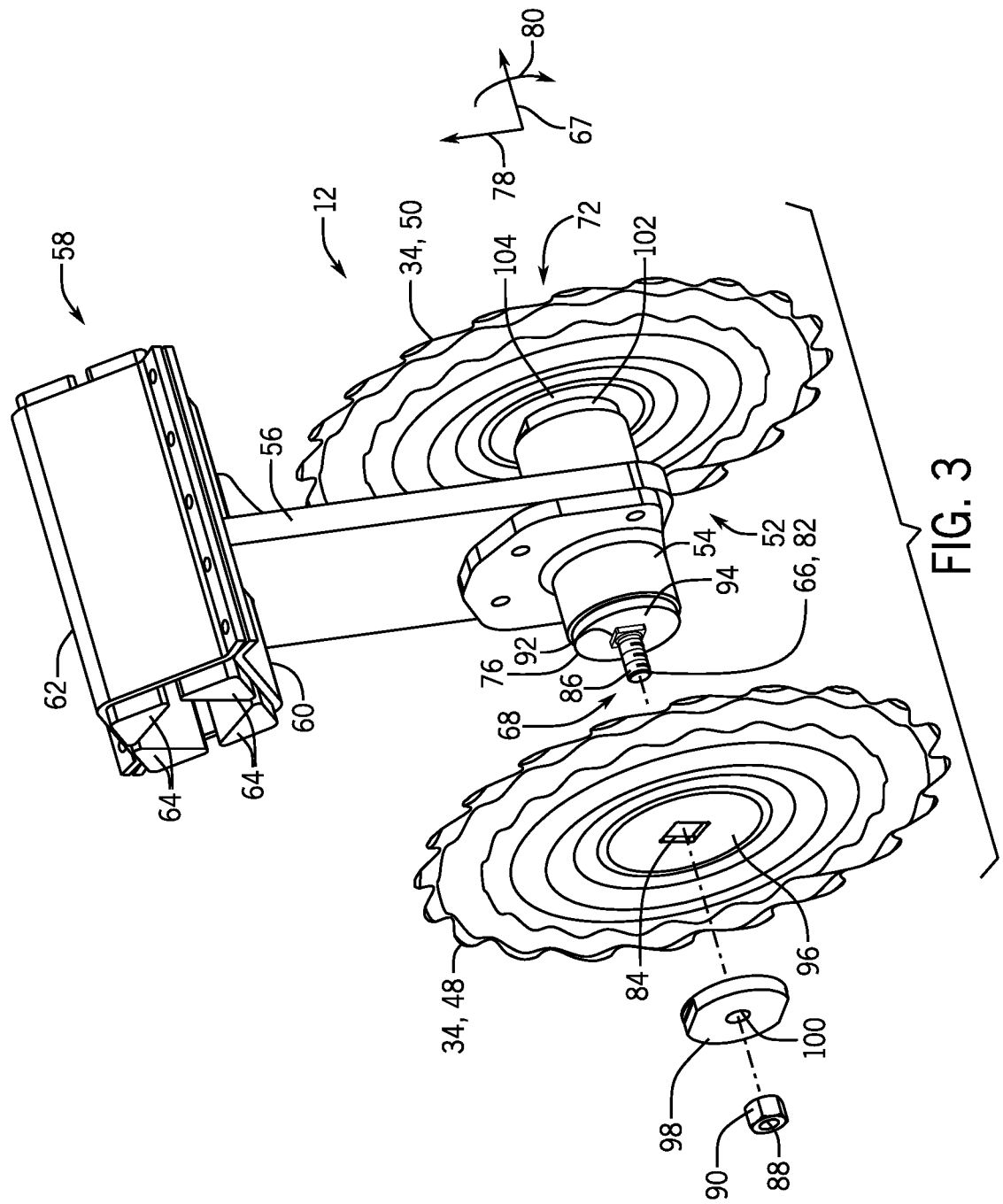
FIG. 3 is an exploded view of the disc assembly of FIG. 2.

FIG. 3 is an exploded view of the disc assembly 12 of FIG. 2. In the illustrated embodiment, the rotatable shaft 66 includes a first longitudinal protrusion 82 at the first longitudinal end portion 68 of the rotatable shaft 66, and the first longitudinal protrusion 82 is configured to engage the opening 84 of the first disc blade 48. Furthermore, in the illustrated embodiment, the first longitudinal protrusion 82 includes an engagement feature 86 (e.g., third engagement feature) configured to engage a corresponding engagement feature 88 (e.g., fourth engagement feature) of a first fastener 90 to couple the first disc blade 48 to the rotatable shaft 66. In the illustrated embodiment, the engagement feature 86 of the first longitudinal protrusion 82 includes external threads, and the engagement feature 88 of the first fastener 90 includes internal threads. The internal threads of the first fastener 90 are configured to engage the external threads of the first longitudinal protrusion 82 via rotation of the first fastener 90 relative to the first longitudinal protrusion 82, thereby coupling the first fastener 90 to the rotatable shaft 66.

While the engagement features include threads in the illustrated embodiment, in other embodiments, the engagement features may include any other suitable type(s) of engagement feature(s) (e.g., alone or in combination with the threads). For example, in certain embodiments, the first fastener engagement feature may include a groove (e.g., extending along the circumferential axis) formed on an inner surface of the first fastener, and the first longitudinal protrusion engagement feature may include an extension (e.g., extending along the circumferential axis) formed on an outer surface of the first longitudinal protrusion (e.g., integrally formed with the first longitudinal protrusion, coupled to the first longitudinal protrusion, etc.). In such embodiments, engagement of the extension with the groove may couple the first fastener to the first longitudinal protrusion. Furthermore, in certain embodiments, the first fastener engagement feature may include an extension (e.g., extending along the circumferential axis) formed on the inner surface of the first fastener (e.g., integrally formed with the first fastener, coupled to the first fastener, etc.), and the first longitudinal protrusion engagement feature may include a groove (e.g., extending along the circumferential axis) formed on the outer surface of the first longitudinal protrusion. In such embodiments, engagement of the extension with the groove may couple the first fastener to the first longitudinal protrusion. In addition, while the first fastener includes a nut in the illustrated embodiment, in other embodiments, the first fastener may include any other suitable type of fastener. For example, in certain embodiments, the first fastener may include a pin, the engagement feature of the pin may include a shaft, and the engagement feature of the first longitudinal protrusion may include an aperture. In such embodiments, the shaft of the pin may be engaged with the aperture of the first longitudinal protrusion to couple the first disc blade to the rotatable shaft.

Furthermore, in the illustrated embodiment, the first longitudinal protrusion 82 forms a first key 92 configured to engage the opening 84 of the first disc blade 48 to block rotation of the first disc blade 48 relative to the rotatable shaft 66. In the illustrated embodiment, the first key 92 has a polygonal shape, and the opening 84 of the first disc blade 48 has a corresponding polygonal shape. The polygonal shape may be a square, as illustrated, a triangle, a pentagon, a hexagon, or any other suitable polygonal shape. Furthermore, the first key of the first longitudinal protrusion and the opening of the first disc blade may have any other shapes suitable for blocking rotation of the disc blade relative to the rotatable shaft while the first key is engaged with the opening. For example, the first key of the first longitudinal protrusion may have an elliptical shape, a star shape, an irregular shape, or another suitable shape, and the opening of the first disc blade may have a corresponding shape. The shape of the first key and the shape of the first disc blade opening may be the same as one another, or the first key and the disc blade opening may have different shapes that enable the first key to engage the opening and to block rotation of the first disc blade relative to the rotatable shaft.

As previously discussed, the first end cap 76 is non-movably (i.e., non-translatably and non-rotatably) coupled to the rotatable shaft 66. At least a portion of the first end cap 76 is configured to be positioned longitudinally outward (e.g., outward along the longitudinal axis 67) from the housing 54, and the first end cap 76 is configured to engage a longitudinally inward surface of the first disc blade 48. In the illustrated embodiment, the first end cap 76 has a substantially flat engagement surface 94. The substantially flat engagement surface 94 of the first end cap 76 is configured to engage a corresponding longitudinally inward surface of a substantially flat portion 96 of the first disc blade 48. Because the engagement surface 94 of the first end cap 76 is substantially flat, the cost of manufacturing the mounting assembly may be reduced (e.g., as compared to a mounting assembly having a curved end cap). In addition, the substantially flat engagement surface of the first end cap may enable the mounting assembly to receive disc blades configured to be mounted in gangs, thereby increasing the variety of disc blades that may be coupled to the mounting assembly. While the first end cap 76 and the first disc blade 48 have corresponding substantially flat surfaces in the illustrated embodiment, in other embodiments, the engagement surface of the first end cap may have another suitable shape (e.g., curved, etc.), and the corresponding surface of the first disc blade may have a similar/complementary shape. Furthermore, while the first end cap 76 directly contacts the first disc blade 48 in the illustrated embodiment, in other embodiments, one or more elements (e.g., gasket(s), washer(s), etc.) may be disposed between the first end cap and the first disc blade. In such embodiments, the first end cap indirectly engages the longitudinally inward surface of the first disc blade.

In the illustrated embodiment, the first end cap 76 and the rotatable shaft 66 are separate elements. For example, the first end cap 76 may be non-movably coupled to the rotatable shaft 66 by a welded connection, a fastener connection, an adhesive connection, other suitable connection(s), or a combination thereof. Furthermore, in certain embodiments, the first end cap and the rotatable shaft may be non-movably coupled via an integral connection. For example, the rotatable shaft and the first end cap may be integrally formed (e.g., from a single piece of material).

In the illustrated embodiment, the mounting assembly 52 includes a first disc blade support 98 having an opening 100 configured to receive the first longitudinal protrusion 82 of the rotatable shaft 66. As illustrated, the first disc blade support 98 is disposed between the first fastener 90 and the first disc blade 48. The first disc blade support 98 is configured to distribute the load applied by the first fastener 90 over a larger area of the first disc blade 48. In certain embodiments, the first disc blade support may be curved along the longitudinal axis, and the first fastener may compress the first disc blade support against the first disc blade. While the mounting assembly 52 includes the first disc blade support 98 in the illustrated embodiment, in other embodiments, the first disc blade support may be omitted.

To couple the first disc blade 48 to the mounting assembly 52, the opening 84 of the first disc blade 48 is aligned with the first key 92. In addition, the first disc blade 48 is rotated about the longitudinal axis 67 to an orientation that facilitates engagement of the first key 92 with the opening 84. The first disc blade 48 is then moved toward the mounting assembly 52 until the first key 92 engages the opening 84 of the first disc blade 48 and the first disc blade 84 engages the first end cap 76. For example, as previously discussed, the first disc blade 48 (e.g., the substantially flat portion 96 of the first disc blade 48) may directly engage the first end cap 76 (e.g., the substantially flat engagement surface 94 of the first end cap 76), or the first disc blade 48 may indirectly engage the first end cap 76 via one or more element(s) (e.g., washer(s), gasket(s), etc.) disposed between the first disc blade 48 and the first end cap 76. Next, the first disc blade support 98 is engaged with the first longitudinal protrusion 82, such that the first longitudinal protrusion 82 extends through the opening 100 of the first disc blade support 98. The engagement feature 88 of the first fastener 90 is then engaged with the engagement feature 86 of the first longitudinal protrusion 82. Accordingly, movement of the first disc blade 48 away from the housing 54 along the longitudinal axis 67 is blocked by the first fastener 90 and the first disc blade support 98, and movement of the first disc blade 48 toward the housing 54 along the longitudinal axis 67 is blocked by the first end cap 76. In addition, rotation of the first disc blade 48 relative to the rotatable shaft 66 is blocked by the interface between the first key 92 and the opening 84 of the first disc blade 48.

In the illustrated embodiment, the second disc blade 50 is coupled to the mounting assembly 54 in the same manner as the first disc blade 48. Accordingly, the mounting assembly includes corresponding elements, such as a second longitudinal protrusion, a second end cap 102, a second fastener, and a second disc blade support, to facilitate coupling the second disc blade to the mounting assembly. Furthermore, the second disc blade 50 includes an opening and a substantially flat portion, as disclosed above with regard to the first disc blade 48. In addition, any of the variations disclosed above with regard to the elements (e.g., of the mounting assembly and the disc blade) configured to mount the first disc blade to the mounting assembly may apply to the elements configured to mount the second disc blade to the mounting assembly.

While each disc blade 34 is non-rotatably coupled to the rotatable shaft 66 via a respective longitudinal protrusion in the illustrated embodiment, in other embodiments, at least one disc blade may be non-rotatably coupled to the rotatable shaft by another suitable connection. For example, in certain embodiments, for coupling at least one disc blade to a respective end portion of the rotatable shaft, the rotatable shaft may have a recess configured to receive the shaft of a fastener, and the shaft of the fastener may engage the recess to couple the disc blade to the rotatable shaft. In such embodiments, the shaft of the fastener may extend through the opening of the disc blade, and a head of the fastener may block movement of the disc blade away from the rotatable shaft. In addition, the respective longitudinal protrusion may include the key, which is configured to engage the opening of the disc blade to block rotation of the disc blade relative to the rotatable shaft. Furthermore, in certain embodiments, for coupling at least one disc blade to a respective end portion of the rotatable shaft, the respective longitudinal protrusion may be omitted, and the disc blade may be coupled to the respective end cap by multiple fasteners distributed about the longitudinal axis, thereby non-rotatably coupling the disc blade to the rotatable shaft.

During operation of the agricultural implement, the disc blades 34 engage the soil. Movement of the agricultural implement along the direction of travel and friction between the disc blades 34 and the soil urges the disc blades and the rotatable shaft 66 to rotate along the circumferential axis 80. Because the disc blades 34 are non-rotatably coupled to the rotatable shaft and the rotatable shaft is configured to rotate relative to the housing 54 of the mounting assembly 52, the disc blades 34 may rotate during operation of the agricultural implement. Because the mounting assembly 52 is configured to rotatably support two disc blades 34, the number of mounting assemblies within the agricultural implement may be reduced (e.g., as compared to an agricultural implement in which each disc blade is supported by a respective mounting assembly), thereby reducing the cost and complexity of the agricultural implement. Furthermore, because each disc blade is coupled to the mounting assembly with a single fastener, the process of replacing each disc blade may be performed significantly faster than replacing a disc blade that is coupled to a mounting assembly with multiple fasteners disposed about an axis of rotation of the disc blade, thereby increasing the efficiency of agricultural (e.g., tillage) operations.

Figure 4:
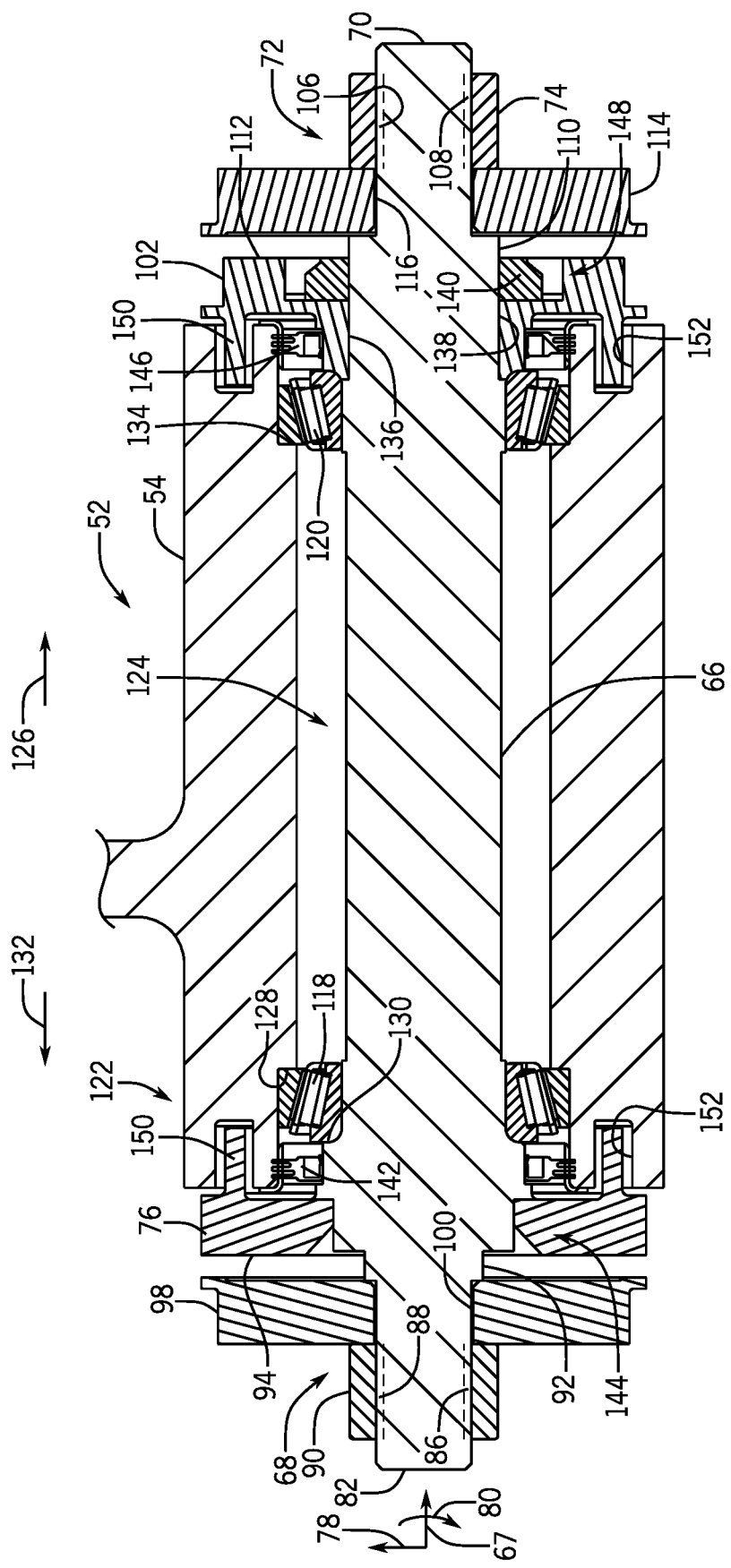
FIG. 4 is a cross-sectional view of a portion of a mounting assembly of the disc assembly of FIG. 2.

FIG. 4 is a cross-sectional view of a portion of the mounting assembly 52 of the disc assembly of FIG. 2. In the illustrated embodiment, the rotatable shaft 66 includes a second longitudinal protrusion 70 at the second longitudinal end portion 72 of the rotatable shaft 66, and the second longitudinal protrusion 70 is configured to engage the opening of the second disc blade. Furthermore, in the illustrated embodiment, the second longitudinal protrusion 70 includes an engagement feature 106 (e.g., fifth engagement feature) configured to engage a corresponding engagement feature 108 (e.g., sixth engagement feature) of the second fastener 74 to couple the second disc blade to the rotatable shaft 66. In the illustrated embodiment, the engagement feature 106 of the second longitudinal protrusion 70 includes external threads, and the engagement feature 108 of the second fastener 74 includes internal threads. The internal threads of the second fastener 74 are configured to engage the external threads of the second longitudinal protrusion 70 via rotation of the second fastener 74 relative to the second longitudinal protrusion 70, thereby coupling the second fastener 74 to the rotatable shaft 66.

While the engagement features include threads in the illustrated embodiment, in other embodiments, the engagement features may include any other suitable type(s) of engagement feature(s) (e.g., alone or in combination with the threads). For example, in certain embodiments, the second fastener engagement feature may include a groove (e.g., extending along the circumferential axis) formed on an inner surface of the second fastener, and the second longitudinal protrusion engagement feature may include an extension (e.g., extending along the circumferential axis) formed on an outer surface of the second longitudinal protrusion (e.g., integrally formed with the second longitudinal protrusion, coupled to the second longitudinal protrusion, etc.). In such embodiments, engagement of the extension with the groove may couple the second fastener to the second longitudinal protrusion. Furthermore, in certain embodiments, the second fastener engagement feature may include an extension (e.g., extending along the circumferential axis) formed on the inner surface of the second fastener (e.g., integrally formed with the second fastener, coupled to the second fastener, etc.), and the second longitudinal protrusion engagement feature may include a groove (e.g., extending along the circumferential axis) formed on the outer surface of the second longitudinal protrusion. In such embodiments, engagement of the extension with the groove may couple the second fastener to the second longitudinal protrusion. In addition, while the second fastener includes a nut in the illustrated embodiment, in other embodiments, the second fastener may include any other suitable type of fastener. For example, in certain embodiments, the second fastener may include a pin, the engagement feature of the pin may include a shaft, and the engagement feature of the second longitudinal protrusion may include an aperture. In such embodiments, the shaft of the pin may be engaged with the aperture of the second longitudinal protrusion to couple the second disc blade to the rotatable shaft.

Furthermore, in the illustrated embodiment, the second longitudinal protrusion 70 forms a second key 110 configured to engage the opening of the second disc blade to block rotation of the second disc blade relative to the rotatable shaft 66. In the illustrated embodiment, the second key 110 has a polygonal shape, and the opening of the second disc blade has a corresponding polygonal shape. The polygonal shape may be a square, a triangle, a pentagon, a hexagon, or any other suitable polygonal shape. Furthermore, the second key of the second longitudinal protrusion and the opening of the second disc blade may have any other shapes suitable for blocking rotation of the second disc blade relative to the rotatable shaft while the second key is engaged with the opening. For example, the second key of the second longitudinal protrusion may have an elliptical shape, a star shape, an irregular shape, or another suitable shape, and the opening of the second disc blade may have a corresponding shape. The shape of the second key and the shape of the second disc blade opening may be the same as one another, or the second key and the disc blade opening may have different shapes that enable the second key to engage the opening and to block rotation of the second disc blade relative to the rotatable shaft.

As discussed in detail below, the second end cap 102 is configured to be non-movably (i.e., non-translatably and non-rotatably) coupled to the rotatable shaft 66. At least a portion of the second end cap 102 is configured to be positioned longitudinally outward (e.g., outward along the longitudinal axis 67) from the housing 54, and the second end cap 102 is configured to engage a longitudinally inward surface of the second disc blade. In the illustrated embodiment, the second end cap 102 has a substantially flat engagement surface 112. The substantially flat engagement surface 112 of the second end cap 102 is configured to engage a corresponding longitudinally inward surface of the substantially flat portion of the second disc blade. Because the engagement surface 112 of the second end cap 102 is substantially flat, the cost of manufacturing the mounting assembly may be reduced (e.g., as compared to a mounting assembly having a curved end cap). In addition, the substantially flat engagement surface of the second end cap may enable the mounting assembly to receive disc blades configured to be mounted in gangs, thereby increasing the variety of disc blades that may be coupled to the mounting assembly. While the second end cap 102 and the second disc blade have corresponding substantially flat surfaces in the illustrated embodiment, in other embodiments, the engagement surface of the second end cap may have another suitable shape (e.g., curved, etc.), and the corresponding surface of the second disc blade may have a similar/complementary shape. Furthermore, while the second end cap 102 is configured to directly contact the second disc blade in the illustrated embodiment, in other embodiments, one or more elements (e.g., gasket(s), washer(s), etc.) may be disposed between the second end cap and the second disc blade. In such embodiments, the second end cap indirectly engages the longitudinally inward surface of the second disc blade.

In the illustrated embodiment, the mounting assembly 52 includes a second disc blade support 114 having an opening 116 configured to receive the second longitudinal protrusion 70 of the rotatable shaft 66. As illustrated, the second disc blade support 114 is configured to be disposed between the second fastener 74 and the second disc blade. The second disc blade support 114 is configured to distribute the load applied by the second fastener 74 over a larger area of the second disc blade. In certain embodiments, the second disc blade support may be curved along the longitudinal axis, and the second fastener may compress the second disc blade support against the second disc blade. While the mounting assembly 52 includes the second disc blade support 114 in the illustrated embodiment, in other embodiments, the second disc blade support may be omitted.

To couple the second disc blade to the mounting assembly 52, the opening of the second disc blade is aligned with the second key 110. In addition, the second disc blade is rotated about the longitudinal axis 67 to an orientation that facilitates engagement of the second key 110 with the opening. The second disc blade is then moved toward the mounting assembly 52 until the second key 110 engages the opening of the second disc blade and the second disc blade engages the second end cap 102. For example, as previously discussed, the second disc blade (e.g., the substantially flat portion of the second disc blade) may directly engage the second end cap 102 (e.g., the substantially flat engagement surface 112 of the second end cap 102), or the second disc blade may indirectly engage the second end cap 102 via one or more element(s) (e.g., washer(s), gasket(s), etc.) disposed between the second disc blade and the second end cap 102. Next, the second disc blade support 114 is engaged with the second longitudinal protrusion 70, such that the second longitudinal protrusion 70 extends through the opening 116 of the second disc blade support 114. The engagement feature 108 of the second fastener 74 is then engaged with the engagement feature 106 of the second longitudinal protrusion 70. Accordingly, movement of the second disc blade away from the housing 54 along the longitudinal axis 67 is blocked by the second fastener 74 and the second disc blade support 114, and movement of the second disc blade toward the housing 54 along the longitudinal axis 67 is blocked by the second end cap 102. In addition, rotation of the second disc blade relative to the rotatable shaft 66 is blocked by the interface between the second key 110 and the opening of the second disc blade.

In the illustrated embodiment, the mounting assembly 52 includes a first bearing 118 and a second bearing 120 (e.g., forming a bearing assembly 122) configured to facilitate rotation of the rotatable shaft 66 relative to the housing 54. As illustrated, the first bearing 118 is disposed about the rotatable shaft 66 within the longitudinal passage 124 of the housing 54, and the second bearing 120 is disposed about the rotatable shaft 66 within the longitudinal passage 124 of the housing 54. In addition, the first bearing 118 is positioned closer to the first longitudinal end portion 68 than the second bearing 120, and the second bearing 120 is positioned closer to the second longitudinal end portion 72 than the first bearing 118. In the illustrated embodiment, the first bearing 118 and the second bearing 120 are roller bearings. However, in other embodiments, at least one of the bearings may be another suitable type of bearing, such as a ball bearing. Furthermore, while the bearing assembly 122 includes two bearings in the illustrated embodiment, in other embodiments, the bearing assembly may include more or fewer bearings (e.g., 0, 1, 3, 4, 5, 6, or more). In addition, the mounting assembly may include other suitable device(s) disposed between the rotatable shaft and the housing to facilitate rotation of the rotatable shaft (e.g., alone or in combination with the bearing(s)), such as bushing(s).

In the illustrated embodiment, movement of the rotatable shaft 66 along the longitudinal axis 67 in a first direction 126 is blocked by the first bearing 118. For example, movement of the first bearing 118 in the first direction 126 is blocked by contact between the first bearing 118 (e.g., an outer race of the first bearing 118) and a shoulder 128 (e.g., first shoulder) of the housing 54, and movement of the rotatable shaft 66 along the longitudinal axis 67 in the first direction 126 is blocked by contact between the first bearing 118 (e.g., an inner race of the first bearing 118) and a shoulder 130 of the rotatable shaft 66. In addition, movement of the second bearing 120 along the longitudinal axis 67 in a second direction 132, opposite the first direction 126, is blocked by contact between the second bearing 120 (e.g., an outer race of the second bearing 120) and a shoulder 134 (e.g., second shoulder) of the housing 54.

In the illustrated embodiment, movement of the rotatable shaft 66 along the longitudinal axis 67 in the second direction 132 is blocked by the second end cap 102. As previously discussed, the second end cap 102 includes a first engagement feature 136 configured to selectively engage a second engagement feature 138 of the rotatable shaft 66 to non-movably couple the second end cap 102 to the rotatable shaft 66. In the illustrated embodiment, the first engagement feature 136 includes internal threads, and the second engagement feature 138 includes external threads. The internal threads of the second end cap 102 are configured to engage the external threads of the rotatable shaft 66 via rotation of the second end cap 102 relative to the rotatable shaft 66, thereby coupling the second end cap 102 to the rotatable shaft 66. The second end cap 102 may be driven to rotate about the rotatable shaft 66 until the second end cap 102 engages the second bearing 120 (e.g., an inner race of the second bearing 120), thereby blocking movement of the rotatable shaft 66 in the second direction 132. In certain embodiments, the second end cap may include feature(s) (e.g., outer flat surface(s), opening(s), recess(es), etc.) configured to enable a tool to drive rotation of the second end cap relative to the rotatable shaft and/or to enable an operator/technician to manually drive the second end cap to rotate relative to the rotatable shaft.

In the illustrated embodiment, the first engagement feature 136 of the second end cap 102 includes an anti-rotation device 140 configured to block rotation of the second end cap 102 relative to the rotatable shaft 66, thereby substantially reducing or eliminating the possibility of disengagement of the second end cap 102 from the rotatable shaft 66 during operation of the agricultural implement. In the illustrated embodiment, the anti-rotation device 140 includes a nut having internal threads configured to engage the external threads of the rotatable shaft 66. However, in other embodiments, the anti-rotation device may include any other suitable device(s) (e.g., alone or in combination with the nut) configured to block rotation of the second end cap relative to the rotatable shaft, such as pin(s), clip(s), other suitable device(s), or a combination thereof. Furthermore, in certain embodiments, the anti-rotation device may be omitted. While the second end cap 102 is coupled to the rotatable shaft 66 by a threaded connection in the illustrated embodiment, in other embodiments, the second end cap may be coupled to the rotatable shaft by other suitable connection(s) (e.g., alone or in combination with the threaded connection), such as pinned connection(s), fastener connection(s), slot/groove connection(s), other suitable type(s) of connection(s), or a combination thereof.

Furthermore, in the illustrated embodiment, the mounting assembly 52 includes a first seal 142 (e.g., labyrinth seal, etc.) configured to substantially block dirt and/or debris from entering the bearing assembly 122 via a first opening 144 in the housing 54. In addition, the mounting assembly 52 includes a second seal 146 (e.g., labyrinth seal, etc.) configured to substantially block dirt and/or debris from entering the bearing assembly 122 via a second opening 148 in the housing 54. While the mounting assembly includes two seals in the illustrated embodiment, in other embodiments, the mounting assembly may include more or fewer seals. For example, in certain embodiments, at least one of the seals may be omitted.

To assemble the mounting assembly 52, the bearings may be disposed within the housing 54. For example, the first bearing 118 may be inserted through the first opening 144 and moved in the first direction 126 until the first bearing 118 engages the shoulder 128, and the second bearing 120 may be inserted through the second opening 148 and moved in the second direction 132 until the second bearing 120 engages the shoulder 134. Next, the first seal 142 may be inserted through the first opening 144 and moved in the first direction 126 until the first seal 142 engages the first bearing 118, and the second seal 146 may be inserted through the second opening 148 and moved in the second direction 132 until the second seal 146 engages the second bearing 120. The rotatable shaft 66 with the first end cap 76 coupled to the rotatable shaft 66 may be moved through the longitudinal passage 124 until the shoulder 130 of the rotatable shaft 66 engages the first bearing 118. Next, the second end cap 102 may be coupled to the rotatable shaft 66, thereby coupling the rotatable shaft 66 to the housing 54 of the mounting assembly 52. The anti-rotation device 140 may then be engaged to block rotation of the second end cap 102 relative to the rotatable shaft 66. Once the mounting assembly 52 is assembled, the disc blades may be coupled to the rotatable shaft in the manner disclosed above. As illustrated, with the mounting assembly 52 assembled, the first engagement feature 136 and the second engagement feature 138 are positioned longitudinally inward (e.g., inward along the longitudinal axis 67) from the second disc blade. Accordingly, the first and second disc blades are removable from the rotatable shaft 66 without disengaging the first and second engagement features, thereby enabling an operator to change disc blades without disassembling the mounting assembly (e.g., without removing the rotatable shaft from the housing).

To disassemble the mounting assembly 52, the first fastener 90, the first disc blade support 98, the first disc blade, the second fastener 74, the second disc blade support 114, and the second disc blade may be removed from the rotatable shaft 66. The anti-rotation device 140 may then be disengaged, and the second end cap 102 may be disengaged from the rotatable shaft 66. The rotatable shaft 66 may then be extracted from the longitudinal passage 124 via movement of the rotatable shaft 66 in the second direction 132. Accordingly, the second end cap 102 is selectively removable from the rotatable shaft 66 via disengagement of the first and second engagement features to facilitate engagement and disengagement of the rotatable shaft 66 with the longitudinal passage 124 of the housing 54.

While the bearings and seals are disposed within the housing before the rotatable shaft during assembly of the mounting assembly in the embodiment disclosed above, in certain embodiments, at least one bearing and/or at least one seal may be disposed within the housing concurrently with or after disposition of the rotatable shaft within the housing. For example, in certain embodiments, the first seal and the first bearing may be disposed on the shaft, such that the first seal and the first bearing are disposed within the housing concurrently with the shaft (e.g., as the shaft moves along the first direction to the illustrated installed position). Additionally or alternatively, the second bearing and/or the second seal may be disposed within the housing after the rotatable shaft is disposed within the housing.

As previously discussed, each end cap is configured to engage a longitudinally inward surface of a respective disc blade. In addition, each end cap is configured to substantially block dirt and/or debris from entering the bearing assembly. In the illustrated embodiment, each end cap includes an annular protrusion 150 configured to engage a respective recess 152 within the housing 54, thereby substantially blocking dirt and/or debris from entering the bearing assembly. Accordingly, in the illustrated embodiment, a portion of each end cap is positioned longitudinally outward (e.g., outward along the longitudinal axis 67) from the housing 54. However, in other embodiments, the protrusion may be omitted from at least one end cap. In such embodiments, the entirety of the end cap may be positioned longitudinally outward from the housing.

Figure 5:
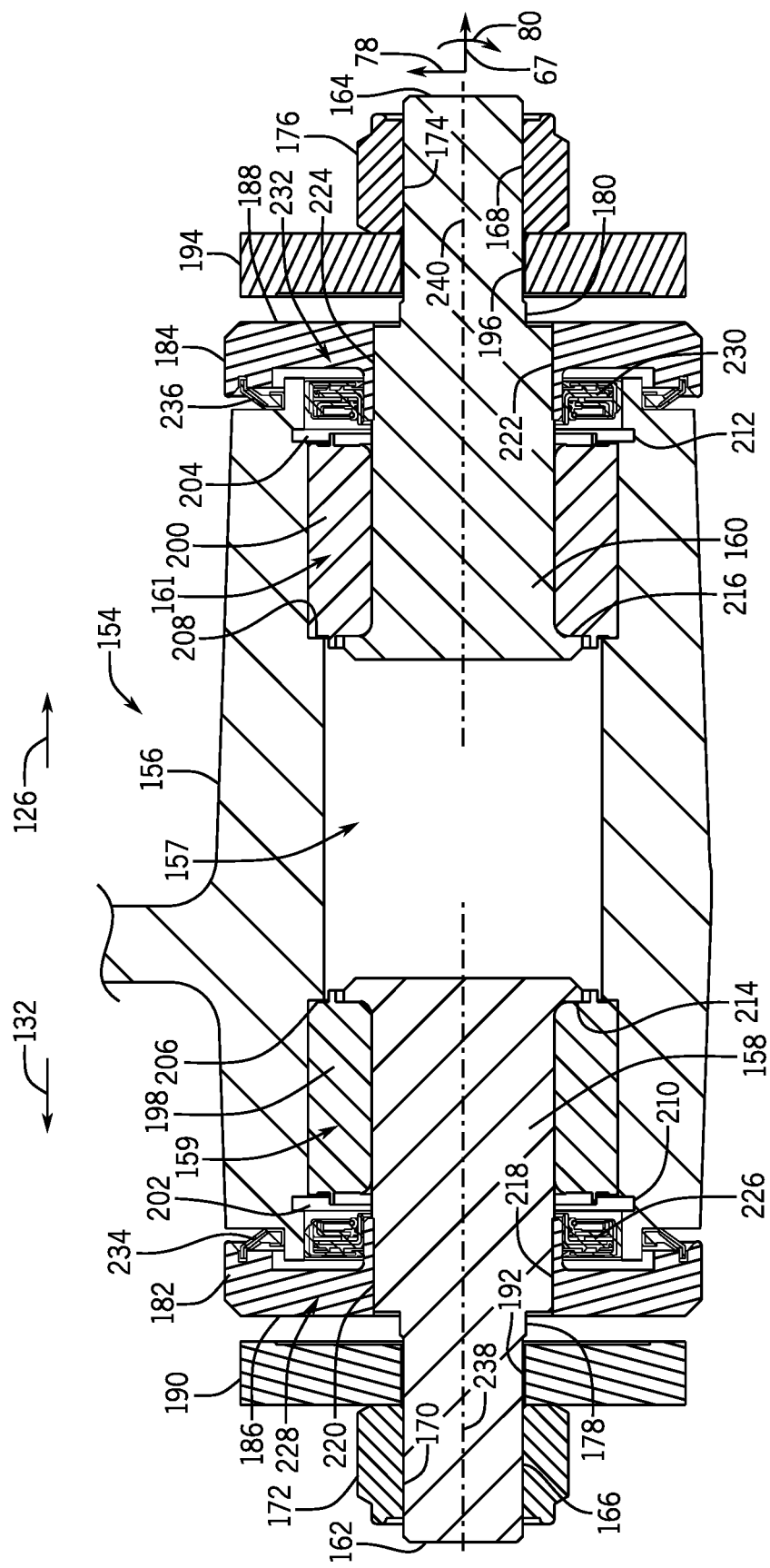
FIG. 5 is a cross-sectional view of a portion of another embodiment of a mounting assembly of a disc assembly that may be employed within the agricultural implement of FIG. 1.

FIG. 5 is a cross-sectional view of a portion of another embodiment of a mounting assembly 154 of a disc assembly that may be employed within the agricultural implement of FIG. 1. In the illustrated embodiment, the mounting assembly 154 includes a housing 156 having a longitudinal passage 157. The mounting assembly 154 also includes a first rotatable shaft 158 disposed within the housing 156, such that the first rotatable shaft 158 extends along a first portion 159 of the longitudinal passage 157. In addition, the mounting assembly 154 includes a second rotatable shaft 160 disposed within the housing 156, such that the second rotatable shaft 160 extends along a second portion 161 of the longitudinal passage 157. The first and second rotatable shafts are configured to rotate independently of one another relative to the housing 156. Accordingly, the disc blades coupled to the respective rotatable shafts are configured to rotate independently of one another during operation of the agricultural implement.

In the illustrated embodiment, the first rotatable shaft 158 includes a longitudinal protrusion 162, and the second rotatable shaft 160 includes a longitudinal protrusion 164. Each longitudinal protrusion is configured to engage an opening of a respective disc blade. Furthermore, in the illustrated embodiment, the longitudinal protrusion 162 of the first rotatable shaft 158 includes an engagement feature 166, and the longitudinal protrusion 164 of the second rotatable shaft 160 includes an engagement feature 168. The engagement feature 166 of the longitudinal protrusion 162 of the first rotatable shaft 158 is configured to engage a corresponding engagement feature 170 of a first fastener 172 to couple the first disc blade to the first rotatable shaft 158, and the engagement feature 168 of the longitudinal protrusion 164 of the second rotatable shaft 160 is configured to engage a corresponding engagement feature 174 of a second fastener 176 to couple the second disc blade to the second rotatable shaft 160. In the illustrated embodiment, the engagement feature of each longitudinal protrusion includes external threads, and the engagement feature of each fastener includes internal threads. The internal threads of each fastener are configured to engage the external threads of the respective longitudinal protrusion via rotation of the fastener relative to the longitudinal protrusion, thereby coupling the fastener to the respective rotatable shaft.

While the engagement features include threads in the illustrated embodiment, in other embodiments, at least one set of corresponding engagement features (e.g., the engagement feature of at least one longitudinal protrusion and the engagement feature of the corresponding fastener(s)) may include any other suitable type(s) of engagement feature(s) (e.g., alone or in combination with the threads). For example, in certain embodiments, the engagement feature of at least one fastener may include a groove (e.g., extending along the circumferential axis) formed on an inner surface of the fastener, and each corresponding longitudinal protrusion engagement feature may include an extension (e.g., extending along the circumferential axis) formed on an outer surface of the respective longitudinal protrusion (e.g., integrally formed with the respective longitudinal protrusion, coupled to the respective longitudinal protrusion, etc.). In such embodiments, engagement of the extension with the groove may couple the fastener to the longitudinal protrusion. Furthermore, in certain embodiments, the engagement feature of at least one fastener may include an extension (e.g., extending along the circumferential axis) formed on the inner surface of the fastener (e.g., integrally formed with the fastener, coupled to the fastener, etc.), and each corresponding longitudinal protrusion engagement feature may include a groove (e.g., extending along the circumferential axis) formed on the outer surface of the respective longitudinal protrusion. In such embodiments, engagement of the extension with the groove may couple the fastener to the longitudinal protrusion. In addition, while each fastener includes a nut in the illustrated embodiment, in other embodiments, at least one fastener may include any other suitable type of fastener. For example, in certain embodiments, at least one fastener may include a pin, the engagement feature of the pin may include a shaft, and the corresponding engagement feature of the respective longitudinal protrusion may include an aperture. In such embodiments, the shaft of the pin may be engaged with the aperture of the longitudinal protrusion to couple the fastener to the respective rotatable shaft.

Furthermore, in the illustrated embodiment, the first longitudinal protrusion 162 forms a first key 178 configured to engage an opening of the first disc blade to block rotation of the first disc blade relative to the first rotatable shaft 158, and the second longitudinal protrusion 164 forms a second key 180 configured to engage an opening of the second disc blade to block rotation of the second disc blade relative to the second rotatable shaft 160. In the illustrated embodiment, each key has a polygonal shape, and the opening of the respective disc blade has a corresponding polygonal shape. The polygonal shape may be a square, a triangle, a pentagon, a hexagon, or any other suitable polygonal shape. Furthermore, the key of at least one longitudinal protrusion and the opening of the respective disc blade may have any other shapes suitable for blocking rotation of the disc blade relative to the respective rotatable shaft while the key is engaged with the opening. For example, the key of at least one longitudinal protrusion may have an elliptical shape, a star shape, an irregular shape, or another suitable shape, and the opening of the respective disc blade may have a corresponding shape. The shape of each key and the shape of the opening of the respective disc blade may be the same as one another, or at least one key and the respective opening may have different shapes that enable the key to engage the opening and to block rotation of the respective disc blade relative to the respective rotatable shaft.

In the illustrated embodiment, a first end cap 182 is non-movably (i.e., non-translatably and non-rotatably) coupled to the first rotatable shaft 158, and a second end cap 184 is non-movably (i.e., non-translatably and non-rotatably) coupled to the second rotatable shaft 160. Each end cap is configured to engage a longitudinally inward surface of a respective disc blade. In the illustrated embodiment, the first end cap 182 has a substantially flat engagement surface 186, and the second end cap 184 has a substantially flat engagement surface 188. The substantially flat engagement surface of each end cap is configured to engage a corresponding longitudinally inward surface of a substantially flat portion of the respective disc blade. Because the engagement surface of each end cap is substantially flat, the cost of manufacturing the mounting assembly may be reduced (e.g., as compared to a mounting assembly having a curved end cap). In addition, the substantially flat engagement surface of each end cap may enable the mounting assembly to receive disc blades configured to be mounted in gangs, thereby increasing the variety of disc blades that may be coupled to the mounting assembly. While the end caps and the disc blades have substantially flat engagement surfaces in the illustrated embodiment, in other embodiments, the engagement surface of at least one end cap may have another suitable shape (e.g., curved, etc.), and the corresponding surface of the respective disc blade may have a similar/complementary shape. Furthermore, while each end cap is configured to directly contact the respective disc blade in the illustrated embodiment, in other embodiments, one or more elements (e.g., gasket(s), washer(s), etc.) may be disposed between at least one end cap and the respective disc blade. In such embodiments, the end cap indirectly engages the longitudinally inward surface of the respective disc blade.

In the illustrated embodiment, the mounting assembly 154 includes a first disc blade support 190 having an opening 192 configured to receive the longitudinal protrusion 162 of the first rotatable shaft 158. In addition, the mounting assembly 154 includes a second disc blade support 194 having an opening 196 configured to receive the longitudinal protrusion 164 of the second rotatable shaft 160. As illustrated, each disc blade support is configured to be disposed between the respective fastener and the respective disc blade. Each disc blade support is configured to distribute the load applied by the respective fastener over a larger area of the respective disc blade. In certain embodiments, at least one disc blade support may be curved along the longitudinal axis, and the respective fastener may compress the disc blade support against the respective disc blade. While the mounting assembly 154 includes two disc blade supports in the illustrated embodiment, in other embodiments, at least one disc blade support may be omitted.

To couple the first disc blade to the mounting assembly 154, the opening of the first disc blade is aligned with the first key 178. In addition, the first disc blade is rotated about the longitudinal axis 67 to an orientation that facilitates engagement of the first key 178 with the opening. The first disc blade is then moved toward the mounting assembly 154 until the first key 178 engages the opening of the first disc blade and the first disc blade engages the first end cap 182. For example, as previously discussed, the first disc blade (e.g., the substantially flat portion of the first disc blade) may directly engage the first end cap 182 (e.g., the substantially flat engagement surface 186 of the first end cap 182), or the first disc blade may indirectly engage the first end cap 182 via one or more element(s) (e.g., washer(s), gasket(s), etc.) disposed between the first disc blade and the first end cap 182. Next, the first disc blade support 190 is engaged with the longitudinal protrusion 162 of the first rotatable shaft 158, such that the longitudinal protrusion 162 extends through the opening 192 of the first disc blade support 190. The engagement feature 170 of the first fastener 172 is then engaged with the engagement feature 166 of the longitudinal protrusion 162. Accordingly, movement of the first disc blade away from the housing 156 along the longitudinal axis 67 is blocked by the first fastener 172 and the first disc blade support 190, and movement of the first disc blade toward the housing 156 along the longitudinal axis 67 is blocked by the first end cap 182. In addition, rotation of the first disc blade relative to the first rotatable shaft 158 is blocked by the interface between the first key 178 and the opening of the first disc blade.

To couple the second disc blade to the mounting assembly 154, the opening of the second disc blade is aligned with the second key 180. In addition, the second disc blade is rotated about the longitudinal axis 67 to an orientation that facilitates engagement of the second key 180 with the opening. The second disc blade is then moved toward the mounting assembly 154 until the second key 180 engages the opening of the second disc blade and the second disc blade engages the second end cap 184. For example, as previously discussed, the second disc blade (e.g., the substantially flat portion of the second disc blade) may directly engage the second end cap 184 (e.g., the substantially flat engagement surface 188 of the second end cap 184), or the second disc blade may indirectly engage the second end cap 184 via one or more element(s) (e.g., washer(s), gasket(s), etc.) disposed between the second disc blade and the second end cap 184. Next, the second disc blade support 194 is engaged with the longitudinal protrusion 164 of the second rotatable shaft 160, such that the longitudinal protrusion 164 extends through the opening 196 of the second disc blade support 194. The engagement feature 174 of the second fastener 176 is then engaged with the engagement feature 168 of the longitudinal protrusion 164. Accordingly, movement of the second disc blade away from the housing 156 along the longitudinal axis 67 is blocked by the second fastener 176 and the second disc blade support 194, and movement of the second disc blade toward the housing 156 along the longitudinal axis 67 is blocked by the second end cap 184. In addition, rotation of the second disc blade relative to the second rotatable shaft 160 is blocked by the interface between the second key 180 and the opening of the second disc blade.

While each disc blade is non-rotatably coupled to the respective rotatable shaft via a longitudinal protrusion in the illustrated embodiment, in other embodiments, at least one disc blade may be non-rotatably coupled to the respective rotatable shaft by another suitable connection. For example, in certain embodiments, for coupling at least one disc blade to the respective rotatable shaft(s), the rotatable shaft may have a recess configured to receive the shaft of a fastener, and the shaft of the fastener may engage the recess to couple the disc blade to the rotatable shaft. In such embodiments, the shaft of the fastener may extend through the opening of the disc blade, and a head of the fastener may block movement of the disc blade away from the rotatable shaft. In addition, the respective longitudinal protrusion may include the key, which is configured to engage the opening of the disc blade to non-rotatably couple the disc blade to the respective rotatable shaft. Furthermore, in certain embodiments, for coupling at least one disc blade to the respective rotatable shaft(s), the respective longitudinal protrusion may be omitted, and the disc blade may be coupled to the respective end cap by multiple fasteners distributed about the longitudinal axis, thereby non-rotatably coupling the disc blade to the respective rotatable shaft.

In the illustrated embodiment, the mounting assembly 154 includes a first bearing 198 disposed between the first rotatable shaft 158 and the housing 156. The first bearing 198 is configured to facilitate rotation of the first rotatable shaft 158 relative to the housing 156. In addition, the mounting assembly 154 includes a second bearing 200 disposed between the second rotatable shaft 160 and the housing 156. The second bearing 200 is configured to facilitate rotation of the second rotatable shaft 160 relative to the housing 156. In the illustrated embodiment, the first bearing 198 and the second bearing 200 are roller bearings. However, in other embodiments, at least one of the bearings may be another suitable type of bearing, such as a ball bearing. Furthermore, while the mounting assembly 154 includes two bearings in the illustrated embodiment, in other embodiments, the mounting assembly may include more or fewer bearings (e.g., 0, 1, 3, 4, 5, 6, or more). For example, in certain embodiments, multiple bearings may be disposed between at least one rotatable shaft and the housing. In addition, the mounting assembly may include other suitable device(s) disposed between at least one rotatable shaft and the housing to facilitate rotation of the rotatable shaft (e.g., alone or in combination with the bearing), such as bushing(s).

In the illustrated embodiment, the first bearing 198 is retained within the housing 156 by a first snap ring 202, and the second bearing 200 is retained within the housing 156 by a second snap ring 204. As illustrated, the housing 156 has a first shoulder 206 configured to engage the first bearing 198 (e.g., an outer race of the first bearing 198) to block longitudinal movement (e.g., movement along the longitudinal axis 67) of the first bearing 198 in the first direction 126 toward the second bearing 200. The housing 156 also has a second shoulder 208 configured to engage the second bearing 200 (e.g., an outer race of the second bearing 200) to block longitudinal movement (e.g., movement along the longitudinal axis 67) of the second bearing 200 in the second direction 132 toward the first bearing 198. In addition, the housing 156 has a first recess 210 configured to receive the first snap ring 202, and the housing 156 has a second recess 212 configured to receive the second snap ring 204. While each bearing is retained within the housing 156 by a respective snap ring and a respective shoulder in the illustrated embodiment, in other embodiments, at least one bearing may be retained within the housing by any other suitable structure/assembly (e.g., two snap rings, one or more fasteners, etc.).

In the illustrated embodiment, longitudinal movement (e.g., movement along the longitudinal axis 67) of the first rotatable shaft 158 away from the second rotatable shaft 160 is blocked by engagement of a shoulder 214 of the first rotatable shaft 158 with the first bearing 198 (e.g., an inner race of the first bearing 198). Accordingly, movement of the first rotatable shaft 158 out of the housing 156 along the second direction 132 is blocked. In addition, longitudinal movement (e.g., movement along the longitudinal axis 67) of the second rotatable shaft 160 away from the first rotatable shaft 158 is blocked by engagement of a shoulder 216 of the second rotatable shaft 160 with the second bearing 200 (e.g., an inner race of the second bearing 200). Accordingly, movement of the second rotatable shaft 160 out of the housing 156 along the first direction 126 is blocked.

In the illustrated embodiment, movement of the first rotatable shaft 158 along the longitudinal axis 67 in the first direction 126 is blocked by the first end cap 182. In addition, movement of the second rotatable shaft 160 along the longitudinal axis 67 in the second direction 132 is blocked by the second end cap 188. In the illustrated embodiment, the first end cap 182 includes a first engagement feature 218 configured to selectively engage a second engagement feature 220 of the first rotatable shaft 158 to non-movably (i.e., non-translatably and non-rotatably) couple the first end cap 182 to the first rotatable shaft 158. Furthermore, the second end cap 184 includes a first engagement feature 222 configured to selectively engage a second engagement feature 224 of the second rotatable shaft 160 to non-movably (i.e., non-translatably and non-rotatably) couple the second end cap 184 to the second rotatable shaft 160. In the illustrated embodiment, the first engagement feature of each end cap includes internal threads, and the second engagement feature of each rotatable shaft includes external threads. The internal threads of each end cap are configured to engage the external threads of the respective rotatable shaft via rotation of the end cap relative to the rotatable shaft, thereby coupling the end cap to the rotatable shaft. In certain embodiments, at least one end cap may include feature(s) (e.g., outer flat surface(s), opening(s), recess(es), etc.) configured to enable a tool to drive rotation of the end cap relative to the respective rotatable shaft and/or to enable an operator/technician to manually drive the end cap to rotate relative to the respective rotatable shaft.

In certain embodiments, each first engagement feature may include an anti-rotation device configured to block rotation of a respective end cap relative to the respective rotatable shaft, thereby substantially reducing or eliminating the possibility of disengagement of the end cap from the rotatable shaft during operation of the agricultural implement. In certain embodiments, at least one anti-rotation device may include a nut having internal threads configured to engage the external threads of the respective rotatable shaft. Furthermore, in certain embodiments, at least one anti-rotation device may include any other suitable device(s) (e.g., alone or in combination with the nut) configured to block rotation of the respective end cap relative to the respective rotatable shaft, such as pin(s), clip(s), other suitable device(s), or a combination thereof. Furthermore, in certain embodiments, at least one anti-rotation device may be omitted. While each end cap is coupled to the respective rotatable shaft by a threaded connection in the illustrated embodiment, in other embodiments, at least one end cap may be coupled to the respective rotatable shaft by other suitable connection(s) (e.g., alone or in combination with the threaded connection), such as pinned connection(s), fastener connection(s), slot/groove connection(s), other suitable type(s) of connection(s), or a combination thereof.

Furthermore, in the illustrated embodiment, the mounting assembly 154 includes a first seal 226 (e.g., labyrinth seal, etc.) configured to substantially block dirt and/or debris from entering the first bearing 198 via a first opening 228 in the housing 156. In addition, the mounting assembly 154 includes a second seal 230 (e.g., labyrinth seal, etc.) configured to substantially block dirt and/or debris from entering the second bearing 200 via a second opening 232 in the housing 156. Furthermore, the first end cap 182 includes a third seal 234 configured to contact the housing 156 to further block dirt and/or debris from entering the first bearing 198 via the first opening 228. In addition, the second end cap 184 includes a fourth seal 236 configured to contact the housing 156 to further block dirt and/or debris from entering the second bearing 200 via the second opening 232. While the mounting assembly includes four seals in the illustrated embodiment, in other embodiments, the mounting assembly may include more or fewer seals. For example, in certain embodiments, at least one of the seals may be omitted.

To assemble the mounting assembly 154, the first bearing 198 may be disposed on the first rotatable shaft 158. The first rotatable shaft 158 and the first bearing 198 may then be inserted through the first opening 228 and moved in the first direction 126 until the first bearing 198 engages the first shoulder 206. Next, the first snap ring 202 may be engaged with the first recess 210, thereby blocking movement of the first bearing 198 along the longitudinal axis 67 in the second direction 132. The first seal 226 may then be inserted through the first opening 228 and moved in the first direction 126 until the first seal 226 engages the snap ring 202/first bearing 198. Next, the first end cap 182 may be coupled to the first rotatable shaft 158, thereby coupling the first rotatable shaft 158 to the housing 156 of the mounting assembly 154. In certain embodiments, the anti-rotation device may be engaged to block rotation of the first end cap relative to the first rotatable shaft. The second rotatable shaft 160 may be coupled to the housing 156 via the same process as described above with regard to the first rotatable shaft 158. Once the mounting assembly 154 is assembled, the disc blades may be coupled to the rotatable shafts in the manner disclosed above. As illustrated, with the mounting assembly 154 assembled, the first engagement features of the end caps and the second engagement features of the rotatable shafts are positioned longitudinally inward (e.g., inward along the longitudinal axis 67) from the disc blades. Accordingly, the first and second disc blades are removable from the respective rotatable shafts without disengaging the first and second engagement features, thereby enabling an operator to change disc blades without disassembling the mounting assembly (e.g., without removing the rotatable shafts from the housing).

In the illustrated embodiment, the housing 156, the first bearing 198, and the second bearing 200 are configured to position the first and second rotatable shafts such that a first rotational axis 238 of the first rotatable shaft 158 and a second rotational axis 240 of the second rotatable shaft 160 are coaxial. However, in other embodiments, the housing, the first bearing, the second bearing, or a combination thereof, may be configured to offset the first rotational axis of the first rotatable shaft from the second rotational axis of the second rotatable shaft. Because the mounting assembly 154 is configured to rotatably support two disc blades, the number of mounting assemblies within the agricultural implement may be reduced (e.g., as compared to an agricultural implement in which each disc blade is supported by a respective mounting assembly), thereby reducing the cost and complexity of the agricultural implement. Furthermore, because each disc blade is coupled to the mounting assembly with a single fastener, the process of replacing each disc blade may be performed significantly faster than replacing a disc blade that is coupled to a mounting assembly with multiple fasteners disposed about an axis of rotation of the disc blade, thereby increasing the efficiency of agricultural (e.g., tillage) operations.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A disc assembly for an agricultural implement, comprising:
   a mounting assembly comprising:
      a housing having a longitudinal passage;
      a rotatable shaft configured to be disposed within the housing, such that the rotatable shaft extends along the longitudinal passage of the housing, wherein the rotatable shaft is configured to rotate relative to the housing;
      a first end cap non-movably coupled to the rotatable shaft, wherein at least a portion of the first end cap is configured to be positioned longitudinally outward from the housing, and the first end cap is configured to engage a longitudinally inward surface of a first disc blade; and
      a second end cap having a first engagement feature configured to selectively engage a second engagement feature of the rotatable shaft to non-movably couple the second end cap to the rotatable shaft, wherein at least a portion of the second end cap is configured to be positioned longitudinally outward from the housing, the second end cap is configured to engage a longitudinally inward surface of a second disc blade, an entirety of the first engagement feature and an entirety of the second engagement feature are configured to be positioned longitudinally inward from the second disc blade, and the second end cap is selectively removable from the rotatable shaft via disengagement of the first and second engagement features to facilitate engagement and disengagement of the rotatable shaft with the longitudinal passage of the housing;

wherein the first engagement feature of the second end cap comprises internal threads, and the second engagement feature of the rotatable shaft comprises external threads.

2. The disc assembly of claim 1, wherein the rotatable shaft comprises a first longitudinal protrusion at a first longitudinal end portion of the rotatable shaft, the first longitudinal protrusion is configured to engage an opening of the first disc blade, the rotatable shaft comprises a second longitudinal protrusion at a second longitudinal end portion of the rotatable shaft, and the second longitudinal protrusion is configured to engage an opening of the second disc blade.

3. The disc assembly of claim 2, wherein the first longitudinal protrusion forms a first key configured to engage the opening of the first disc blade to block rotation of the first disc blade relative to the rotatable shaft, and the second longitudinal protrusion forms a second key configured to engage the opening of the second disc blade to block rotation of the second disc blade relative to the rotatable shaft.

4. The disc assembly of claim 2, wherein the first longitudinal protrusion comprises a third engagement feature configured to engage a fourth engagement feature of a first fastener to couple the first disc blade to the rotatable shaft, and the second longitudinal protrusion comprises a fifth engagement feature configured to engage a sixth engagement feature of a second fastener to couple the second disc blade to the rotatable shaft.

5. The disc assembly of claim 1, wherein the mounting assembly comprises:
a first bearing configured to be disposed about the rotatable shaft and within the longitudinal passage of the housing; and
a second bearing configured to be disposed about the rotatable shaft and within the longitudinal passage of the housing.

6. The disc assembly of claim 5, wherein the first bearing is configured to engage a first shoulder of the housing and a shoulder of the rotatable shaft, and the second bearing is configured to engage a second shoulder of the housing.

7. The disc assembly of claim 1, wherein the mounting assembly comprises:
a first seal configured to be disposed about the rotatable shaft and within the longitudinal passage of the housing, wherein the first seal is configured to be positioned adjacent to the first end cap; and
a second seal configured to be disposed about the rotatable shaft and within the longitudinal passage of the housing, wherein the second seal is configured to be positioned adjacent to the second end cap.

8. A disc assembly for an agricultural implement, comprising:
a first disc blade having an opening;
a second disc blade having an opening;
a mounting assembly comprising:
a housing having a longitudinal passage;
a rotatable shaft configured to be disposed within the housing, such that the rotatable shaft extends along the longitudinal passage of the housing, wherein the rotatable shaft is configured to rotate relative to the housing, the rotatable shaft comprises a first longitudinal protrusion at a first longitudinal end portion of the rotatable shaft, the first longitudinal protrusion is configured to engage the opening of the first disc blade, the rotatable shaft comprises a second longitudinal protrusion at a second longitudinal end portion of the rotatable shaft, and the second longitudinal protrusion is configured to engage the opening of the second disc blade;

a first end cap non-movably coupled to the rotatable shaft, wherein at least a portion of the first end cap is configured to be positioned longitudinally outward from the housing, and the first end cap is configured to engage a longitudinally inward surface of the first disc blade; and a second end cap having a first engagement feature configured to selectively engage a second engagement feature of the rotatable shaft to non-movably couple the second end cap to the rotatable shaft, wherein at least a portion of the second end cap is configured to be positioned longitudinally outward from the housing, the second end cap is configured to engage a longitudinally inward surface of the second disc blade, an entirety of the first engagement feature and an entirety of the second engagement feature are configured to be positioned longitudinally inward from the second disc blade, the second end cap is selectively removable from the rotatable shaft via disengagement of the first and second engagement features to facilitate engagement and disengagement of the rotatable shaft with the longitudinal passage of the housing, and the first and second disc blades are removable from the rotatable shaft without disengaging the first and second engagement features;

wherein the first engagement feature of the second end cap comprises internal threads, and the second engagement feature of the rotatable shaft comprises external threads.

9. The disc assembly of claim 8, wherein the first longitudinal protrusion forms a first key configured to engage the opening of the first disc blade to block rotation of the first disc blade relative to the rotatable shaft, and the second longitudinal protrusion forms a second key configured to engage the opening of the second disc blade to block rotation of the second disc blade relative to the rotatable shaft.

10. The disc assembly of claim 8, wherein the first longitudinal protrusion comprises a third engagement feature configured to engage a fourth engagement feature of a first fastener to couple the first disc blade to the rotatable shaft, and the second longitudinal protrusion comprises a fifth engagement feature configured to engage a sixth engagement feature of a second fastener to couple the second disc blade to the rotatable shaft.

11. The disc assembly of claim 8, wherein the mounting assembly comprises:
a first bearing configured to be disposed about the rotatable shaft and within the longitudinal passage of the housing; and
a second bearing configured to be disposed about the rotatable shaft and within the longitudinal passage of the housing.

12. The disc assembly of claim 8, wherein the mounting assembly comprises:
a first seal configured to be disposed about the rotatable shaft and within the longitudinal passage of the housing, wherein the first seal is configured to be positioned adjacent to the first end cap; and
a second seal configured to be disposed about the rotatable shaft and within the longitudinal passage of the housing, wherein the second seal is configured to be positioned adjacent to the second end cap.

\* \* \* \* \*